United States Patent
Yang

(10) Patent No.: US 10,283,805 B2
(45) Date of Patent: May 7, 2019

(54) METHOD OF MANUFACTURING BATTERY

(71) Applicant: ASUSTeK COMPUTER INC., Taipei (TW)

(72) Inventor: Fei-Lin Yang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 180 days.

(21) Appl. No.: 15/403,152

(22) Filed: Jan. 10, 2017

(65) Prior Publication Data

US 2017/0207479 A1    Jul. 20, 2017

(30) Foreign Application Priority Data

Jan. 20, 2016  (TW) .............................. 105101650 A

(51) Int. Cl.
*H01M 10/00* (2006.01)
*H01M 10/04* (2006.01)
*H01M 10/0525* (2010.01)

(52) U.S. Cl.
CPC ... *H01M 10/0436* (2013.01); *H01M 10/0525* (2013.01); *H01M 2220/30* (2013.01)

(58) Field of Classification Search
CPC ......... H01M 10/0525; H01M 2220/30; H01M 10/0436
See application file for complete search history.

(56) References Cited

U.S. PATENT DOCUMENTS

| | | | |
|---|---|---|---|
| 2010/0221611 A1 | 9/2010 | Menke et al. | |
| 2012/0214040 A1 | 8/2012 | Tsutsumi et al. | |
| 2013/0230646 A1 | 9/2013 | Wallace et al. | |
| 2014/0308576 A1* | 10/2014 | Gaben ................... | C25D 13/02 429/185 |

FOREIGN PATENT DOCUMENTS

| | | |
|---|---|---|
| CN | 101033553 | 9/2007 |
| CN | 102473903 | 5/2012 |
| CN | 103560252 | 2/2014 |

\* cited by examiner

*Primary Examiner* — Cynthia H Kelly
*Assistant Examiner* — Monique M Wills
(74) *Attorney, Agent, or Firm* — JCIPRNET

(57) ABSTRACT

A method of manufacturing a battery is provided. The steps are as follows: forming an anode material and a cathode material on a first side and a second side of an isolation film, respectively, wherein the first side is opposite to the second side; forming a first protection layer on the first side of the isolation film; forming a first metal layer on the second side of the isolation film; forming a second protection layer on the first metal layer; removing the first protection layer; forming a second metal layer on the first side of the isolation film; and removing the second protection layer.

10 Claims, 2 Drawing Sheets

METHOD OF MANUFACTURING BATTERY

CROSS-REFERENCE TO RELATED APPLICATION

This application claims the priority benefit of Taiwan application Ser. No. 105101650, filed on Jan. 20, 2016. The entirety of the above-mentioned patent application is hereby incorporated by reference herein and made a part of this specification.

BACKGROUND OF THE INVENTION

Field of the Invention

The invention relates to a method of manufacturing a battery.

Description of the Related Art

Lithium ion batteries have a high energy density without the memory effect. In addition, when the lithium ion batteries are not in used, the power lost is less. Therefore, the lithium-ion batteries are widely used in notebook computers, mobile phones, cameras, PDA, Bluetooth headsets and wireless 3C products and other consumer electronics.

Within the trend that the electronic products become lighter, smaller and thinner. The lithium ion batteries manufactured by the conventional methods which has large in size is no longer applicable.

BRIEF SUMMARY OF THE INVENTION

According to one aspect of the disclosure, a method of manufacturing a battery, comprises: forming an anode material and a cathode material on a first side and a second side of an isolation film, respectively, wherein the first side is opposite to the second side; forming a first protection layer on the first side of the isolation film; forming a first metal layer on the second side of the isolation film; forming a second protection layer on the first metal layer; removing the first protection layer; forming a second metal layer on the first side of the isolation film; and removing the second protection layer.

These and other features, aspects and advantages of the invention will become better understood with regard to the following embodiments and accompanying drawings.

DETAILED DESCRIPTION OF THE EMBODIMENTS

Figure 1A:
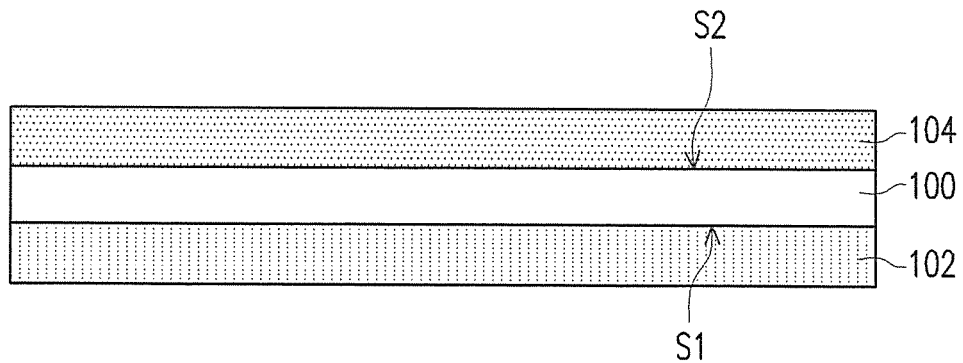
FIG. 1A to FIG. 1E shows cross-section diagrams of a process of manufacturing a battery in an embodiment.

To produce a battery by the method of the present application discloses, FIG. 1A to FIG. 1E shows cross-section diagrams step by step in an embodiment.

Refer to FIG. 1, first, an isolation film is provided. The isolation film includes a first side S1 and a second side S2 opposite to each other. In an embodiment, the material of the isolation film 100 is made of an insulating material. In embodiments, the insulating material is made of polypropylene (PP), polyethylene (PE), or a combination thereof. In FIG. 1A, the first side S1 is under the second side S2, which is not limited herein. In another embodiment, the first side S1 is above the second side S2.

Then, the anode material 102 is formed at the first side S1 of the isolation film 100, and the cathode material 104 is formed on the second side S2 of the isolation film 100. In another embodiment, the cathode material 104 is formed at the first side S1 of the isolation film 100, and the anode material 102 is formed at the second side S2 of the isolation film 100, which is not limited herein. In an embodiment, the anode material 102 is lithium cobalt oxide, lithium nickel cobalt manganese oxide, lithium nickel titanium oxide, lithium manganese oxide, lithium phosphate iron oxide, lithium nickel manganese oxide, or combinations thereof. The cathode material 104 is graphite composites, such as graphite, silicon carbide (SiC), silicon oxide (SiO), tin oxide (SnO), or combinations thereof. In an embodiment, the method of forming the anode material 102 and the cathode material 104 is a wet deposition method. The wet deposition method is, in an embodiment, a screen printing method, an embossing method, a relief printing method, a lithography method, or a combination thereof.

In addition, in an embodiment, before the cathode material 102 and the cathode material 104 are formed, the sealing material is selectively formed on the surface of the insulation film 100 (including the surfaces of the first side S1 and the second side S2). The sealing material includes a ceramic material in an embodiment. The ceramic material includes titanium dioxide, silicon dioxide, or a combination thereof. The method of forming the sealing material includes a wet coating method such as a brush coating method, a spray coating method, a screen printing method, a lamination method, a roll coating method, a bonding method, or a combination thereof. The sealing material improves the mechanical properties of the insulation film 100 and prevents the short circuit of the battery due to the direct contact between the anode and the cathode under heat environment, which ensures the battery safety.

The steps of forming the cathode material 102 and the cathode material 104 are continuous steps or non-continuous steps. In an embodiment, the cathode material 102 and the cathode material 104 are formed in a same process (that is the continuous step), which saves time. In an embodiment, the anode material 102 and the cathode material 104 are formed in different processes (that is the non-continuous step). In an embodiment, the anode material 102 is formed by one process, and the cathode material 104 is formed by another process. In an embodiment, the thickness of the anode material 102 and that of the cathode material 104 which are formed by the non-continuous step are uniform.

Figure 1B:
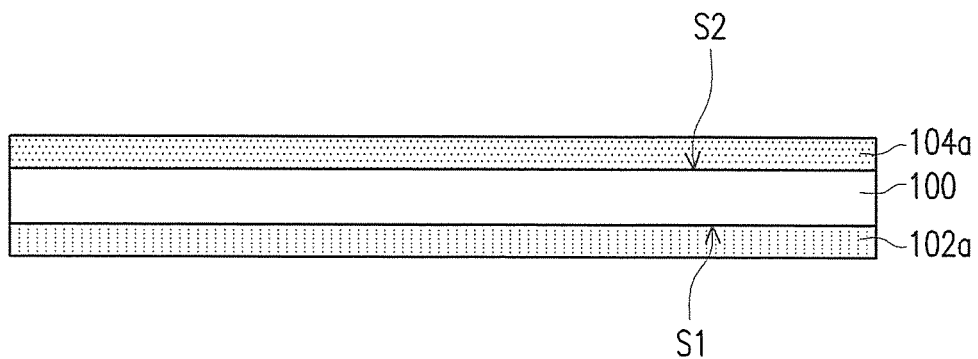

Please refer to FIG. 1A and FIG. 1B. A drying process is performed on the insulation film 100. The drying process is, in an embodiment, performed at 25° C. to 90° C. Then, a bonding process is performed on the anode material 102 and the cathode material 104. In an embodiment, the bonding process is performed with a double roller. After the bonding process, the thickness of the anode material 102a and the cathode material 104a is thinner.

Figure 1C:
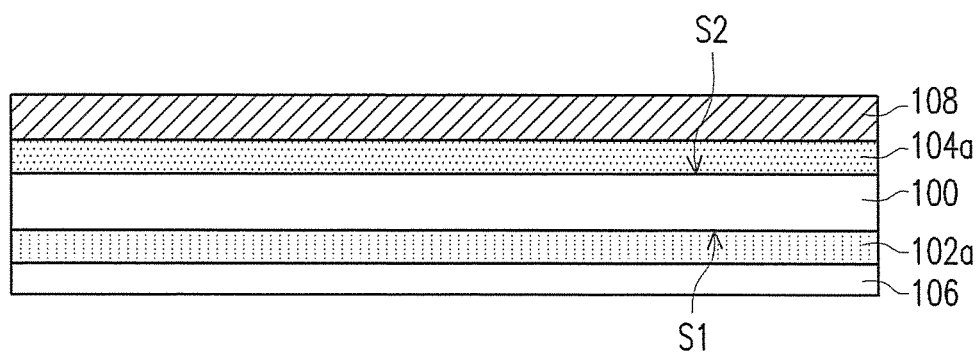

Please refer to FIG. 1B and FIG. 1C. A first protective layer 106 is formed on the anode material 102a. In an embodiment, the material of the first protective layer 106 is a strippable material, such as a resin material. In an embodiment, the first protective layer 106 is formed by a wet deposition method, such as one or a combination of a brush coating method, a spray coating method, a printing method.

Then, a first metal layer 108 (such as a cathode plate) is formed on the cathode material 104a. In an embodiment, the material of the first metal layer 108 is aluminum, copper, nickel, or combinations thereof. In an embodiment, the first metal layer 108 is formed by a dry deposition process or a wet deposition process. In an embodiment, the dry deposition method is a physical vapor deposition (PVD) method, an atomic layer deposition (ALD) method, or a combination thereof. In an embodiment, the wet deposition method is electroplating, chemical plating, or a combination thereof.

Figure 1D:
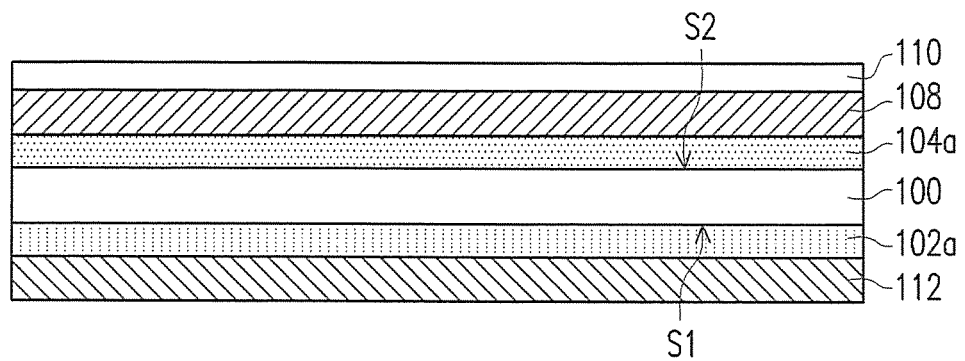

Please refer to FIG. 1C and FIG. 1D. A second protective layer 110 is formed on the first metal layer 108. In an embodiment, the material of the second protective layer 110 is a strippable material. In an embodiment, the strippable material is a resin material formed by a wet deposition method. In an embodiment, the wet deposition method is a brush coating method, a spray coating method, a printing method, or a combination thereof.

Next, the first protective layer 106 is removed by stripping. Then, a second metal layer 112 (such as an anode plate) is formed on the anode material 102a. In an embodiment, the material of the second metal layer 112 is aluminum, copper, nickel, or combinations thereof. In an embodiment, the second metal layer 112 is formed by a dry deposition method or a wet deposition method. In an embodiment, the dry deposition method is a physical vapor deposition (PVD) method, an atomic layer deposition (ALD) method, or a combination thereof. In an embodiment, the wet deposition method is electroplating, chemical plating, or a combination thereof.

In different types of batteries, the material of the first metal layer 108 and the second metal layer 112 are the same or different. In an embodiment, in a lithium ion battery, the anode plate material is aluminum, and the cathode plate material is copper, which is not limited herein. The oxidation potential difference should exist between the anode plate material and the cathode plate material. In the nickel-hydrogen battery, nickel is used as the anode plate material.

Figure 1E:
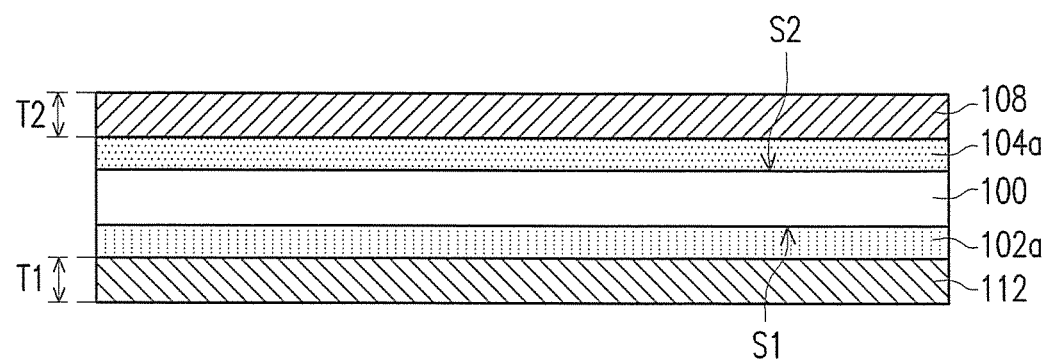

Please refer to FIG. 1D and FIG. 1E. The second protective layer 110 is stripped to form a partial battery structure 10 (as shown in FIG. 1E). In one embodiment, the thickness T1 of the combination of the second metal layer 112 and the anode material 102a (such as anode plate) is between 0.3 µm and 2.0 µm. The thickness T2 of the combination of the first metal layer 108 and the cathode material 104a (such as cathode plate) is between 0.3 µm and 2.0 µm.

In an embodiment, the battery has a stacked partial battery structures 10. The anode plate, the isolation film, the cathode plate, the isolation film, and the anode plate are sequentially stacked. The stacked partial battery structure 10 is immersed in an electrolyte solution. Therefore, when the thickness of an anode plate or a cathode plate in the embodiment becomes thin, the overall thickness of the stacked partial battery structure 10 is reduced. In an embodiment, the main component of the electrolyte solution is a conductive salt such as Lithium Hexafluorophosphate or Lithium Hexafluoroarsenate.

In the embodiment in FIG. 1C to FIG. 1E, the first metal layer 108 is formed on the cathode material 104a first. In another embodiment, the second metal layer 112 is formed on the anode material 102a before the first metal layer 108.

In sum, an anode material and a cathode material are formed on opposite sides of an isolation film. Next, a metal layer (used as an electrode plate) is formed on the anode material and the cathode material, respectively. the method of manufacturing the battery in embodiments further reduces the thickness of the electrode plate, and the battery production is improved. In addition, the method of manufacturing the battery is a continuous process or a one-time operation in different embodiments, which can further reduce the manufacturing cost.

Although the invention includes been disclosed with reference to certain embodiments thereof, the disclosure is not for limiting the scope. Persons having ordinary skill in the art may make various modifications and changes without departing from the scope of the invention. Therefore, the scope of the appended claims should not be limited to the description of the embodiments described above.

What is claimed is:

1. A method of manufacturing a battery, comprising:
   forming an anode material and a cathode material on a first side and a second side of an isolation film, respectively, wherein the first side is opposite to the second side;
   forming a first protection layer on the anode material;
   forming a first metal layer on the cathode material, wherein the cathode material is located between the isolation film and the first metal layer;
   forming a second protection layer on the first metal layer;
   removing the first protection layer;
   forming a second metal layer on the anode material, wherein the anode material is located between the isolation film and the second metal layer; and
   removing the second protection layer.

2. The method of manufacturing a battery according to claim 1, wherein after forming the anode material and the cathode material, the method further comprises:
   drying the isolation film; and
   bonding the anode material and the cathode material.

3. The method of manufacturing a battery according to claim 1, wherein the anode material and the cathode material are formed by a wet deposition method.

4. The method of manufacturing a battery according to claim 1, wherein the anode material and the cathode material are formed via continuous steps or non-continuous steps.

5. The method of manufacturing a battery according to claim 1, wherein the first metal layer and the second metal layer are formed via a dry deposition method or a wet deposition method.

6. The method of manufacturing a battery according to claim 1, wherein the material of the first protection layer and the second protection layer are strippable materials, respectively.

7. The method of manufacturing a battery according to claim 6, wherein the strippable material includes a resin material.

8. The method of manufacturing a battery according to claim 1, wherein the first protection layer and the second protection layer are formed by a wet deposition method.

9. The method of manufacturing a battery according to claim 1, before forming the cathode material and the anode material, further comprising:
   forming a sealing material on the surface of the isolation film.

10. The method of manufacturing a battery according to claim 9, wherein the sealing material includes a ceramic material.

* * * * *